Dec. 23, 1941.   L. G. BURKHART   2,267,491
PAN GREASING MACHINE
Filed Oct. 24, 1940   3 Sheets-Sheet 1
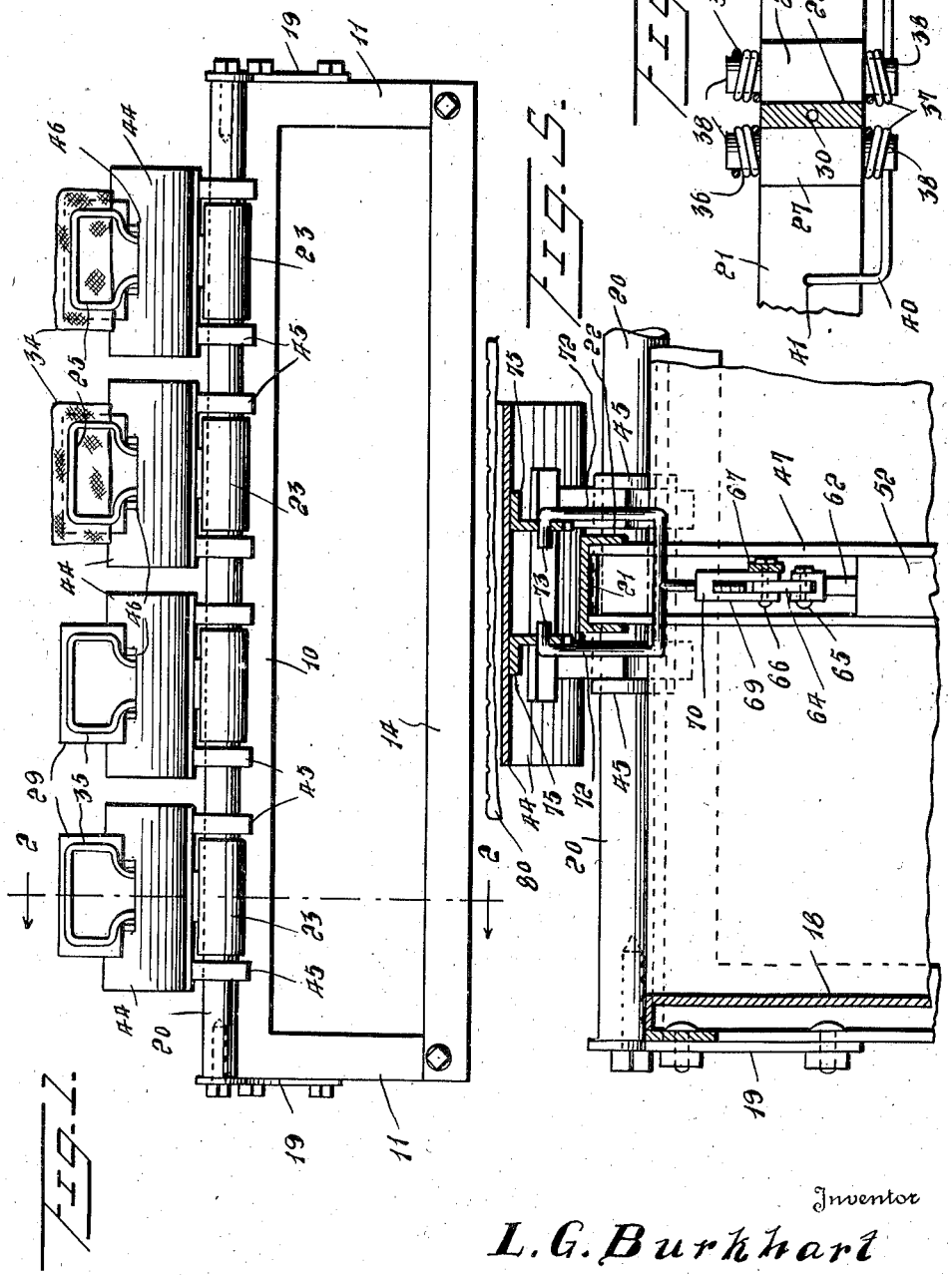
Inventor
L. G. Burkhart
By Bryant Lowry
Attorneys

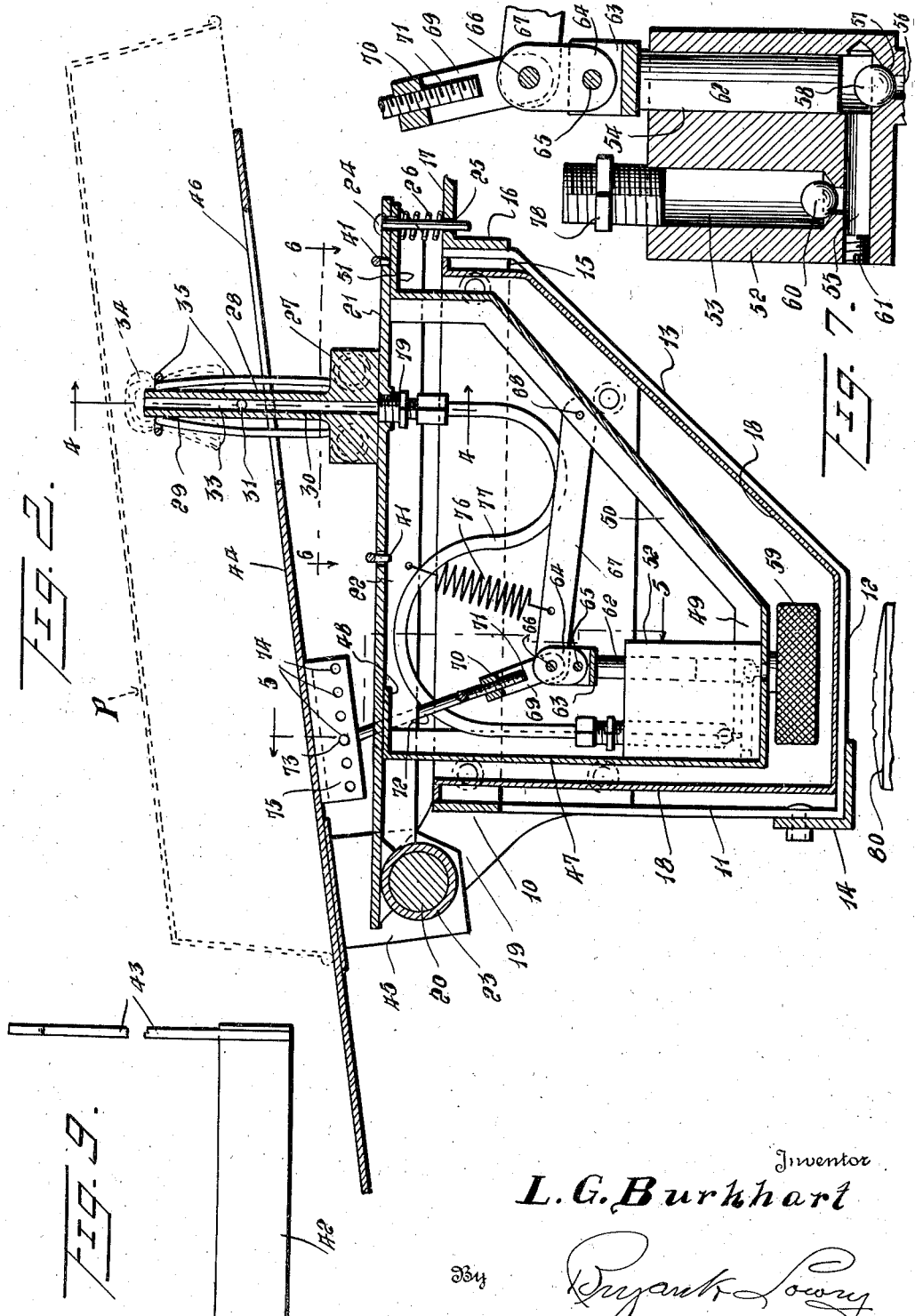

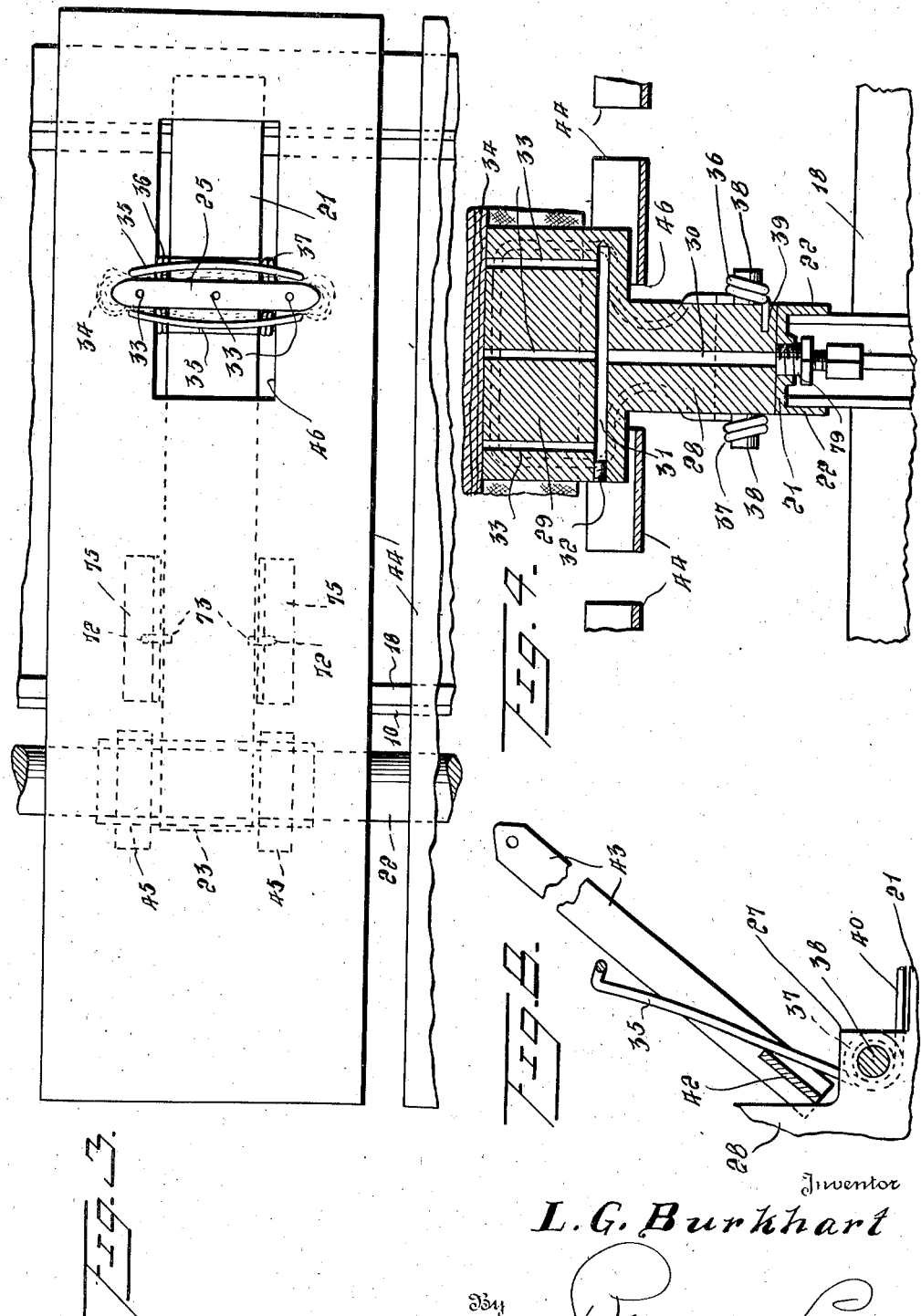

Patented Dec. 23, 1941

2,267,491

UNITED STATES PATENT OFFICE 2,267,491

PAN GREASING MACHINE

Lester Glen Burkhart, Sacramento, Calif.

Application October 24, 1940, Serial No. 362,653

15 Claims. (Cl. 91—39)

This invention relates to certain new and useful improvements in pan greasing machines.

The primary object of the invention is to provide a pan greasing machine and one that is especially designed for the greasing of bread pans and in which a grease absorbent pad rising above a bed plate is adapted to have grease automatically supplied thereto upon downward pressure on the bed plate occupied by the placement of the bread pan in inverted position onto the bed plate and over the pad with the bread pan movable over the pad to have the inner surfaces thereof greased.

Bread pans are usually assembled in groups of three or more rigidly connected individual pans and the greasing machine of this invention is constructed to provide a greaser for each pan of such a group.

With the above and other objects in view that will become apparent as the nature of the invention is better understood, the same consists in general of certain novel details of construction and combination of parts hereinafter more fully described, illustrated in the accompanying drawings and claimed.

In the accompanying drawings:

Fig. 1 is a rear elevational view of a pan greasing machine constructed in accordance with the present invention, showing an assembly or battery of four pan greasers, Fig. 2 is a vertical cross-sectional view taken on line 2—2 of Fig. 1, showing the cushioned bed plate carrying the pan greaser and the pivotally mounted pan supporting plate for operating the grease pump that supplies the greaser, Fig. 3 is a fragmentary top plan view showing one of the greasers extending upwardly through an opening in one of the pan supporting plates, Fig. 4 is a vertical detail sectional view taken on line 4—4 of Fig. 2, showing the grease passages through the head of the pan greaser, Fig. 5 is a fragmentary vertical sectional view taken on line 5—5 of Fig. 2, Fig. 6 is a horizontal detail sectional view taken on line 6—6 of Fig. 2, Fig. 7 is a fragmentary vertical sectional view through the grease pump, Fig. 8 is a fragmentary sectional view showing one of the spring arms for holding the greasing pad in its pad-releasing or opened position by means of a key, and Fig. 9 is a fragmentary side elevational view of the key for releasing the pad holding spring.

The pan greasing machine comprises a skeleton frame structure formed of angle, channel and flat irons, the rear wall of the frame structure comprising a head rail 10 carrying depending corner legs 11 with forwardly directed horizontal base portions 12 that carry at their forward ends upwardly and forwardly inclined front corner legs 13. The rear corner legs at the lower ends thereof are connected together and braced by angle irons 14, while upper side rails 15 extend between the opposite ends of the head rail 10 of the rear wall and the front ends of the front corner legs 13. An angle iron 17 forming a front head rail connects the upper ends of the front legs 13 and includes a forwardly directed horizontal flange 17. The frame structure described has a grease receptacle 18 removably mounted therein, the upper end of the grease receptacle 18 being in the plane of the upper end of the frame structure as shown in Fig. 2.

Upwardly and rearwardly directed brackets 19 are carried by the upper end of the rear wall structure of the machine and provide bearings for a longitudinally extending shaft 20 and as a series of pan greasers per se together with associated bed plates are supported on the shaft 20, only one of said pan greasing devices will be described. Each pan greasing device comprises a bed plate 21 of channel formation opening downwardly and having side flanges 22, the rear end of the bed plate 21 carrying on its underside a sleeve 23 journaled on the shaft 20 while a pin 24 depending from the front end of the bed plate 21 is selectively received in an opening 25 in the horizontal flange 17 of the angle iron 16 to hold the bed plate 21 against lateral shifting movements and providing adjustment therefor to accommodate the relative positioning of the series of pan greasers with respect to a battery of bread pans. The forward end of the bed plate 21 is cushioned by means of the spring 26 surrounding the pin 24 between the bed plate 21 and the flange 17.

A pan greaser rises from the bed plate 21 adjacent the free forward end thereof and above the grease receptacle 18, the pan greaser comprising a base block 27 carrying an upstanding head of T-formation having a flat vertical leg 28 and a cross head 29 at its upper end. A central vertical bore 30 extends upwardly through the base block 27 and leg 28 and communicates with a cross bore 31 in the cross head 29, the cross bore 31 being closed at one end and having its other end opening through the cross head and closed by a removable block 32 to facilitate cleaning thereof. A series of vertical bores 33 extend from the cross bore 31 upwardly through the upper side of the cross head 29. An absorbent pad 34 of suitable material such as fabric or the like covers the cross head 29 and is saturated by grease forced through the bores in a manner to be presently described. To hold the absorbent pad in position on the cross head 29, a spring arm is associated with each side of the cross head to engage the outer face of the pad 34 as illustrated, each spring arm including a looped upper portion 35 having the lower ends 36 and 37 respectively coiled upon outwardly extending lugs 38 carried by the leg 28 of the greaser head, the terminal end 39 of the spring loop 36 being anchored in the leg 28, while the terminal end 40 of the spring loop 37 is anchored in the upper face of the channel bed plate 21 as shown at 41. To release each spring loop 35 for moving the same away from the cross head 29 to release the absorbent pad 30 for replacement or the like, there is provided a key shown in Figs. 8 and 9 as comprising an elongated blade 42 with a handle 43 rising from one end thereof. The blade 42 is adapted to be positioned between the lower portions of the spring loop 35 and the adjacent side face of the leg 28 of the greaser head for moving the spring 35 away from the greaser head as shown in Fig. 8.

A bread pan supporting plate 44 is pivotally mounted upon the shaft 20 above the bed plate 21 by means of a pair of apertured lugs 45 journaled upon the shaft 20 at opposite sides of the sleeve 23 that pivotally supports the bed plate 21, this mounting for the pan supporting plate 44 being clearly illustrated in Figs. 1 and 2. The pan supporting plate 44 has a longitudinally slotted opening 45 therein through which the pan greasing head upwardly projects as illustrated in the several views.

A grease pump is carried by the bed plate 21 and the piston of the grease pump is adjustably and operatively connected to the pan supporting plate 44 and, as shown more clearly in Figs. 2, 5 and 7, a channel iron frame is carried by and depends from the bed plate 21 for normal location within the grease receptacle 18. The channel frame comprises a vertical rear leg 47 having the upper end 48 thereof secured to the underside of the bed plate 21 with the leg 47 positioned in proximity of the rear wall of the grease receptacle 18, the channel frame further including a lower horizontal base portion 49 that carries at its forward end an upwardly and forwardly inclined leg portion 50 that is connected at its upper end as at 51 to the underside of the forward free end of the bed plate 21. A pump block 52 is supported on the base portion 49 of the channel frame and has a pair of vertical bores 53 and 54 therein that are connected at their lower ends by means of a lower horizontal cross bore 55. An apertured nipple 56 depends from the pump block 52 at the point of communication between the lower end of the vertical bore 54 and the cross bore 55 and is constructed to provide a valve seat 57 closed by a downwardly seating valve 58. The nipple 56 extends through the base portion 49 of the channel frame and carries below said channel frame and within the grease receptacle 18, a filter cage 59. A downwardly seating valve 60 controls communication between the lower end of the vertical bore 53 and the cross bore 55 and the open end of the bore 55 spaced from the valve 58 to facilitate cleaning of the pump block is closed by a screw plug 61. A piston 62 is reciprocably mounted in the vertical bore 54 and projecting above said pump block has a head 63 upon the upper end thereof upon which one end of a link 64 is pivotally mounted as at 65. The other end of the link is pivotally mounted as at 66 to one end of a bar 67 that has its other end pivotally attached as at 68 to the vertical leg 50 of the channel frame, this assemblage of elements being operative to assure vertical movement of the piston 62 in the piston block. The legs 69 of the clevis are pivotally mounted on the pin 66, while the head 70 of the clevis has a screw 71 adjustably threaded therethrough, the upper end of the screw being forked to provide a pair of side legs 72 having inturned ends 73 adjustably received in a series of openings 74 in angle iron brackets 75 secured to and depending from the pan supporting plate 44. The pan supporting plate 44 and pump piston 62 are normally held at their limits of upward movements by means of the coil spring connections 76 between the bar 67 and a side flange 22 of the bed plate 21 as will at once be apparent from an inspection of Fig. 2. The connection between the pump block 52 and the greaser head includes a flexible conduit 77, one end of which is connected to the fitting 78 threaded into the upper end of the vertical bore 53 in the valve block 52, while the other end of the flexible conduit is attached to a fitting 79 mounted in the bed plate 21 and in communication with the bore 30 through the leg 28 of the greaser head. A gas burner 80 or other heating means is disposed beneath the lower end of the grease or grease receptacle 18.

From the above detailed description of the invention, it is believed that the construction and operation thereof will at once be apparent, it being noted that the bed plates 21 together with the associated bread pan supporting plates 44 may be longitudinally shifted upon the shaft 20 to accommodate the relationship of batteries of bread pans and that the elements after adjustments are retained in their shifted positions by the pin 24 receivable in selected openings 25 in the flange 17 at the front side of the machine. With fat or lard in the receptacle 18, the depressing of the forward end of the plate 44 by means of a pan P shown by dotted lines in Fig. 2 placed on the plate 44 overlying the greaser head, pivotally moves the plate 44 on the shaft 20 to depress the screw rod 71 for the operation of the pump piston 62 to force any grease in the pump block upwardly into the bore 52 by way of the valve 60 and through the flexible conduit 77 into the bore in the base block 27 of the greaser head for distribution through the several bores 30, 31 and 33 in the greaser head for the saturation of the pad 34. By moving the pans back and forth over the saturated pads 34 the inner faces of the bottom and side walls of the pans are greased. It will be understood that by several pivotal movements of the bread pan supporting plate 44 the piston 62 will be reciprocated in the pump block to draw fat or grease from the receptacle 18 through the filter cage 59 and into the lower end of the vertical bore 54 and cross bore 55, downward movement of the piston 62 causing the valve 58 to engage its seat 57 and force the grease through the cross bore 55 upwardly by way of the valve 60 into the bore 53 and flexible conduit 77. The spring 26 associated with the forward end of the bed plate 21 acts as a shock absorber in cushioning downward pressure on the pan supporting plate 44. When desired, the bed plate 21 with all of the elements supported thereby and the bread pan supporting plate 44 may be pivotally moved on the shaft 20 to a position outwardly and laterally of the grease receptacle 18 whereby the latter may be removed for cleaning purposes and also to present the elements of the machine in position for ready access for cleaning or repair.

While there is herein shown and described the preferred embodiment of the invention, it is to be understood that minor changes may be made in the details of construction, such as will fall within the scope of the invention as claimed.

I claim:

1. In a pan greasing machine of the character described, a frame structure having a horizontal bearing shaft, a grease receptacle supported in the frame structure, a series of pan greasing units for the simultaneous greasing of a battery of pans, each unit comprising a bed plate pivotally mounted at one end on the shaft and normally overlying the grease receptacle, a pan greaser rising from the bed plate, a pan supporting plate pivotally mounted on the shaft and overlying the bed plate and having an opening therein through which the pan greaser upwardly extends and pump mechanism in communication with the greaser and operated by the pan supporting plate.

2. In a pan greasing machine of the character described, a frame structure having a horizontal bearing shaft, a grease receptacle supported in the frame structure, a bed plate pivotally mounted at one end on the shaft and normally overlying the grease receptacle, a pan greaser rising from the bed plate, a pan supporting plate pivotally mounted on the shaft and overlying the bed plate and having an opening therein through which the pan greaser upwardly extends and pump mechanism in communication with the greaser and operated by the pan supporting plate, the pump mechanism being supported by and depending from the bed plate for unitary movement therewith.

3. In a pan greasing machine of the character described, a frame structure having a horizontal bearing shaft, a grease receptacle supported in the frame structure, a bed plate pivotally mounted at one end on the shaft and normally overlying the grease receptacle, a pan greaser rising from the bed plate, a pan supporting plate pivotally mounted on the shaft and overlying the bed plate and having an opening therein through which the pan greaser upwardly extends and pump mechanism in communication with the greaser and operated by the pan supporting plate, the pump mechanism being supported by and depending from the bed plate for unitary movement therewith and means for normally holding the pan supporting plate at its limit of upward movement.

4. In a pan greasing machine of the character described, a frame structure having a horizontal bearing shaft, a grease receptacle supported in the frame structure, a series of pan greasing units for the simultaneous greasing of a battery of pans, each unit comprising a bed plate pivotally mounted at one end on the shaft and normally overlying the grease receptacle, a pan greaser rising from the bed plate, a pan supporting plate pivotally mounted on the shaft and overlying the bed plate and having an opening therein through which the pan greaser upwardly extends and pump mechanism in communication with the greaser and operated by the pan supporting plate, said pan greasing units being laterally adjustable longitudinally of the shaft and a cushioned support for the free end of each bed plate operative to hold the bed plate in adjusted position.

5. In a pan greasing machine of the character described, a frame structure having a horizontal bearing shaft, a grease receptacle supported in the frame structure, a series of pan greasing units for the simultaneous greasing of a battery of pans, each unit comprising a bed plate pivotally mounted at one end on the shaft and normally overlying the grease receptacle, a pan greaser rising from the bed plate, a pan supporting plate pivotally mounted on the shaft and overlying the bed plate and having an opening therein through which the pan greaser upwardly extends and pump mechanism in communication with the greaser and operated by the pan supporting plate, the pump mechanism being supported by and depending from the bed plate, said pan greasing units being laterally adjustable longitudinally of the shaft and a cushioned support for the free end of each bed plate operative to hold the bed plate in adjusted position.

6. In a pan greasing machine of the character described, a frame structure having a horizontal bearing shaft, a series of pan greasing units for the simultaneous greasing of a battery of pans, each unit comprising a grease receptacle supported in the frame structure, a bed plate pivotally mounted at one end on the shaft and normally overlying the grease receptacle, a pan greaser rising from the bed plate, a pan supporting plate pivotally mounted on the shaft and overlying the bed plate and having an opening therein through which the pan greaser upwardly extends and pump mechanism in communication with the greaser and operated by the pan supporting plate, the pump mechanism being supported by and depending from the bed plate, means for normally holding the pan supporting plate of each unit at its limit of upward movement, said pan greasing units being laterally adjustable longitudinally of the shaft and a cushioned support for the free end of each bed plate operative to hold the bed plate in associated position.

7. In a pan greasing machine of the character described, a frame structure having a horizontal bearing shaft, a grease receptacle supported in the frame structure, a series of pan greasing units for the simultaneous greasing of a battery of pans, each unit comprising a bed plate pivotally mounted at one end on the shaft and normally overlying the grease receptacle, a pan greaser rising from the bed plate, a pan supporting plate pivotally mounted on the shaft and overlying the bed plate and having an opening therein through which the pan greaser upwardly extends and pump mechanism in communication with the greaser and operated by the pan supporting plate, said pan greasing units being laterally adjustable longitudinally of the shaft, a cushioned support for the free end of each bed plate operative to hold the bed plate in adjusted position, a frame one the bed plate, each pump mechanism for each pan greasing unit including a pump block supported on the frame, a piston in the pump block, an adjustable connection between the piston and pan supporting plate, a flexible conduit connection between the pump block and greaser and valve devices in the pump block operated by the piston permitting the flow of grease into the pump block and preventing the return of grease from the pump block to the receptacle.

8. In a pan greasing machine of the character described, a frame structure having a horizontal bearing shaft, a grease receptacle supported in the frame structure, a series of pan greasing units for the simultaneous greasing of a battery of pans, each unit comprising a bed plate pivotally mounted at one end on the shaft and normally overlying the grease receptacle, a pan greaser rising from the bed plate, a pan-supporting plate pivotally mounted on the shaft and overlying the bed plate and having an opening therein through which the pan greaser upwardly extends and pump mechanism in communication with the greaser and operated by the pan-supporting plate, the pump mechanism being supported by and depending from the bed plate, said pan greasing units being laterally adjustable longitudinally of the shaft and a cushioned support for the free end of each bed plate operative to hold the bed plate in adjusted position, a frame on each bed plate, the pump mechanism for each pan greasing unit including a pump block supported on the frame, a piston in the pump block, an adjustable connection between the piston and pan supporting plate, a flexible conduit connection between the pump block and greaser and valve devices in the pump block operated by the piston permitting the flow of grease into the pump block and preventing the return of grease from the pump block to the receptacle.

9. In a pan greasing machine of the character described, a frame structure having a horizontal bearing shaft, a grease receptacle supported in the frame structure, a series of pan greasing units for the simultaneous greasing of a battery of pans, each unit comprising a bed plate pivotally mounted at one end on the shaft and normally overlying the grease receptacle, a pan greaser rising from the bed plate, a pan-supporting plate pivotally mounted on the shaft and overlying the bed plate and having an opening therein through which the pan greaser upwardly extends and pump mechanism in communication with the greaser and operated by the pan-supporting plate, the pump mechanism being supported by and depending from the bed plate, means for normally holding each pan supporting plate at its limit of upward movement, said pan greasing units being laterally adjustable longitudinally of the shaft and a cushioned support for the free end of each bed plate operative to hold the bed plate in adjusted position, a frame on each bed plate, the pump mechanism for each pan greasing unit including a pump block supported on the frame, a piston in the pump block, an adjustable connection between the piston and pan supporting plate, a flexible conduit connection between the pump block and greaser and valve devices in the pump block operated by the piston permitting the flow of grease into the pump block and preventing the return of grease from the pump block to the receptacle.

10. In a pan greasing machine of the character described, a frame structure having a horizontal bearing shaft, a grease receptacle supported in the frame structure, a series of pan greasing units for the simultaneous greasing of a battery of pans, each unit comprising a bed plate pivotally mounted at one end on the shaft and normally overlying the grease receptacle, a pan greaser rising from the bed plate, a pan supporting plate pivotally mounted on the shaft and overlying the bed plate and having an opening therein through which the pan greaser upwardly extends and pump mechanism in communication with the greaser and operated by the pan supporting plate, said pan greasing units being laterally adjustable longitudinally of the shaft and a cushioned support for the free end of each bed plate operative to hold the bed plate in adjusted position, the pan greaser including a greaser head having grease bores therein, a fabric pad covering the head and a pair of spring arms engageable with opposite sides of the head for holding the pad in position thereon.

11. In a pan greasing machine of the character described, a frame structure having a horizontal bearing shaft, a grease receptacle supported in the frame structure, a series of pan greasing units for the simultaneous greasing of a battery of pans, each unit comprising a bed plate pivotally mounted at one end on the shaft and normally overlying the grease receptacle, a pan greaser rising from the bed plate, a pan-supporting plate pivotally mounted on the shaft and overlying the bed plate and having an opening therein through which the pan greaser upwardly extends and pump mechanism in communication with the greaser and operated by the pan-supporting plate, the pump mechanism being supported by and depending from the bed plate, said pan greasing units being laterally adjustable longitudinally of the shaft and a cushioned support for the free end of each bed plate operative to hold the bed plate in adjusted position, the pan greaser including a greaser head having grease bores therein, a fabric pad covering the head and a pair of spring arms engageable with opposite sides of the head for holding the pad in position thereon.

12. In a pan greasing machine of the character described, a frame structure having a horizontal bearing shaft, a grease receptacle supported in the frame structure, a series of pan greasing units for the simultaneous greasing of a battery of pans, each unit comprising a bed plate pivotally mounted at one end on the shaft and normally overlying the grease receptacle, a pan greaser rising from the bed plate, a pan-supporting plate pivotally mounted on the shaft and overlying the bed plate and having an opening therein through which the pan greaser upwardly extends and pump mechanism in communication with the greaser and operated by the pan-supporting plate, the pump mechanism being supported by and depending from the bed plate, and means for normally holding the pan supporting plate at its limit of upward movement, said pan greasing units being laterally adjustable longitudinally of the shaft and a cushioned support for the free end of each bed plate operative to hold the bed plate in adjusted position, the pan greaser including a grease head having grease bores therein, a fabric pad covering the head and a pair of spring arms engageable with opposite sides of the head for holding the pad in position thereon.

13. In a pan greasing machine of the character described, a frame structure having a horizontal bearing shaft, a grease receptacle supported in the frame structure, a series of pan greasing units for the simultaneous greasing of a battery of pans, each unit comprising a bed plate pivotally mounted at one end on the shaft and normally overlying the grease receptacle, a pan greaser rising from the bed plate, a pan supporting plate pivotally mounted on the shaft and overlying the bed plate and having an opening therein through which the pan greaser upwardly extends and pump mechanism in communication with the greaser and operated by the pan supporting plate, said pan greasing units being laterally adjustable longitudinally of the shaft and a cushioned support for the free end of each bed plate operative to hold the bed plate in adjusted position, a frame on each bed plate, the pump mechanism for each pan greasing unit including a pump block supported on the frame, a piston in the pump block, an adjustable connection between the piston and pan supporting plate, a flexible conduit connection between the pump block and greaser and valve devices in the pump block operated by the piston permitting the flow of grease into the pump block and preventing the return of grease from the pump block to the receptacle, the pan greaser including a greaser head having grease bores therein, a fabric pad covering the head and a pair of spring arms engageable with opposite sides of the head for holding the pad in position thereon.

14. In a pan greasing machine of the character described, a frame structure having a horizontal bearing shaft, a grease receptacle supported in the frame structure, a series of pan greasing units for the simultaneous greasing of a battery of pans, each unit comprising a bed plate pivotally mounted at one end on the shaft and normally overlying the grease receptacle, a pan greaser rising from the bed plate, a pan-supporting plate pivotally mounted on the shaft and overlying the bed plate and having an opening therein through which the pan greaser upwardly extends and pump mechanism in communication with the greaser and operated by the pan-supporting plate, the pump mechanism being supported by and depending from the bed plate, said pan greasing units being laterally adjustable longitudinally of the shaft and a cushioned support for the free end of each bed plate operative to hold the bed plate in adjusted position, a frame on each bed plate, the pump mechanism for each pan greasing unit including a pump block supported on the frame, a piston in the pump block, an adjustable connection between the piston and pan supporting plate, a flexible conduit connection between the pump block and greaser and valve devices in the pump block operated by the piston permitting the flow of grease into the pump block and preventing the return of grease from the pump block to the receptacle, the pan greaser including a greaser head having grease bores therein, a fabric pad covering the head and a pair of spring arms engageable with opposite sides of the head for holding the pad in position thereon.

15. In a pan greasing machine of the character described, a frame structure having a horizontal bearing shaft, a grease receptacle supported in the frame structure, a series of pan greasing units for the simultaneous greasing of a battery of pans, each unit comprising a bed plate pivotally mounted at one end on the shaft and normally overlying the grease receptacle, a pan greaser rising from the bed plate, a pan-supporting plate pivotally mounted on the shaft and overlying the bed plate and having an opening therein through which the pan greaser upwardly extends and pump mechanism in communication with the greaser and operated by the pan-supporting plate, the pump mechanism being supported by and depending from the bed plate, means for normally holding the pan supporting plate at its limit of upward movement, said pan greasing units being laterally adjustable longitudinally of the shaft and a cushioned support for the free end of each bed plate operative to hold the bed plate in adjusted position, a frame on each bed plate, the pump mechanism for each pan greasing unit including a pump block supported on the frame, a piston in the pump block, an adjustable connection between the piston and pan supporting plate, a flexible conduit connection between the pump block and greaser and valve devices in the pump block operated by the piston permitting the flow of grease into the pump block and preventing the return of grease from the pump block to the receptacle, the pan greaser including a greaser head having grease bores therein, a fabric pad covering the head and a pair of spring arms engageable with opposite sides of the head for holding the pad in position thereon.

LESTER GLEN BURKHART.